(12) United States Patent
Kawakami

(10) Patent No.: US 9,209,725 B2
(45) Date of Patent: Dec. 8, 2015

(54) MOTOR DRIVE CIRCUIT

(75) Inventor: Hiroaki Kawakami, Gunma (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 192 days.

(21) Appl. No.: 13/234,949

(22) Filed: Sep. 16, 2011

(65) Prior Publication Data
US 2012/0068648 A1 Mar. 22, 2012

(30) Foreign Application Priority Data

Sep. 16, 2010 (JP) .................. 2010-208159

(51) Int. Cl.
H02P 6/00 (2006.01)
H02P 6/04 (2006.01)
H02P 6/14 (2006.01)

(52) U.S. Cl.
CPC ........................................ H02P 6/14 (2013.01)

(58) Field of Classification Search
USPC ......... 318/254.1, 254.2, 294, 400.27, 400.26, 318/400.28, 400.29, 674
See application file for complete search history.

(56) References Cited

U.S. PATENT DOCUMENTS

| | | | | |
|---|---|---|---|---|
| 7,271,554 B2* | 9/2007 | Aizawa | ..................... | B41J 29/38 318/34 |
| 7,583,038 B2* | 9/2009 | Aizawa | ..................... | B41J 29/38 318/34 |
| 2006/0102532 A1* | 5/2006 | Cadotte | ........................... | 210/94 |
| 2007/0285034 A1* | 12/2007 | Aizawa | ..................... | B41J 29/38 318/34 |
| 2008/0204914 A1* | 8/2008 | Hashizume | ............ | G11B 5/022 360/46 |
| 2010/0053802 A1* | 3/2010 | Yamashita | ........... | G11B 5/5547 360/78.04 |
| 2010/0181951 A1* | 7/2010 | Noie et al. | ............... | 318/400.11 |
| 2010/0201297 A1* | 8/2010 | Nachev et al. | ........... | 318/400.34 |

FOREIGN PATENT DOCUMENTS

| | | |
|---|---|---|
| JP | 2004-014940 A | 1/2004 |
| JP | 2005065486 A | 3/2005 |
| JP | 2008160952 A | 7/2008 |

OTHER PUBLICATIONS

Title: Voice coil motor driver for camera auto focus; Texas Instruments DRV201, Revise Nov. 2013; all pages.*

* cited by examiner

*Primary Examiner* — Eduardo Colon Santana
*Assistant Examiner* — Iftekhar Mustafa

(57) ABSTRACT

A motor drive circuit includes: a first H-bridge circuit including a first source transistor and a first sink transistor connected in series and a second source transistor and a second sink transistor connected in series; a second H-bridge circuit including a third source transistor and a third sink transistor connected in series and a fourth source transistor and a fourth sink transistor connected in series; and a first control circuit to turn on or off the first and second source transistors and the third and fourth sink transistors in a synchronized manner, turn on or off the third and fourth source transistors and the first and second sink transistors in a synchronized manner, and further turn on or off the first and second source transistors and the third and fourth sink transistors in a complementary manner to the third and fourth source transistors and the first and second sink transistors.

19 Claims, 4 Drawing Sheets

US 9,209,725 B2

MOTOR DRIVE CIRCUIT

CROSS-REFERENCE TO RELATED APPLICATION

This application claims the benefit of priority to Japanese Patent Application No. 2010-208159, filed Sep. 16, 2010, of which full contents are incorporated herein by reference.

BACKGROUND OF THE INVENTION

1. Field of the Invention

The present invention relates to a motor drive circuit.

2. Description of the Related Art

In electronic devices such as a printer, a plurality of motors are used in order to drive a head mechanism, a paper feed mechanism, and the like. Thus, in such an electronic device, a motor drive circuit capable of driving a plurality of motors may be used (See Japanese Patent Laid-Open Publication No. 2004-14940, for example).

FIG. 4 is an example of a motor drive circuit 200 configured to drive motors 300 and 301, which are DC motors. An H-bridge circuit 210 supplies an electric current from a terminal A1 to a terminal B1 when the motor 300 is rotated normally, and supplies an electric current from the terminal B1 to the terminal A1 when the motor 300 is rotated reversely, based on an instruction from a microcomputer 310. An H-bridge circuit 211 supplies an electric current from a terminal A2 to a terminal B2 when the motor 301 is rotated normally, and supplies an electric current from a terminal B2 to a terminal A2 when the motor 301 is rotated reversely, based on an instruction from a microcomputer 310. When the motors 300 and 301 are to be stopped rotating, the microcomputer 310 controls the H-bridge circuits 210 and 211 so as to stop the current to be supplied to the motors 300 and 301.

As a result, the motors 300 and 301 rotate in accordance with the instruction from the microcomputer 310.

If a current to be supplied to the motor is to be increased, for example, one motor 302 might be driven by the two H-bridge circuits 210 and 211, as illustrated in FIG. 5. In order to rotate the motor 302 in a desired direction, the directions of the currents need to be matched which are supplied from the H-bridge circuits 210 and 211 to the motor 302. That is, the terminals A1 and A2 need to be connected, while the terminals B1 and B2 need to be connected. As a result, if the common motor 302 (motor coil) is to be driven by the motor drive circuit 200, wiring on a substrate mounted with the motor 302 results in being complicated.

SUMMARY OF THE INVENTION

A motor drive circuit according to an aspect of the present invention, includes: a first H-bridge circuit including a first source transistor and a first sink transistor connected in series and a second source transistor and a second sink transistor connected in series; a second H-bridge circuit including a third source transistor and a third sink transistor connected in series and a fourth source transistor and a fourth sink transistor connected in series; and a first control circuit configured to turn on or off the first and second source transistors and the third and fourth sink transistors in a synchronized manner, turn on or off the third and fourth source transistors and the first and second sink transistors in a synchronized manner, and further turn on or off the first and second source transistors and the third and fourth sink transistors in a complementary manner to the third and fourth source transistors and the first and second sink transistors.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
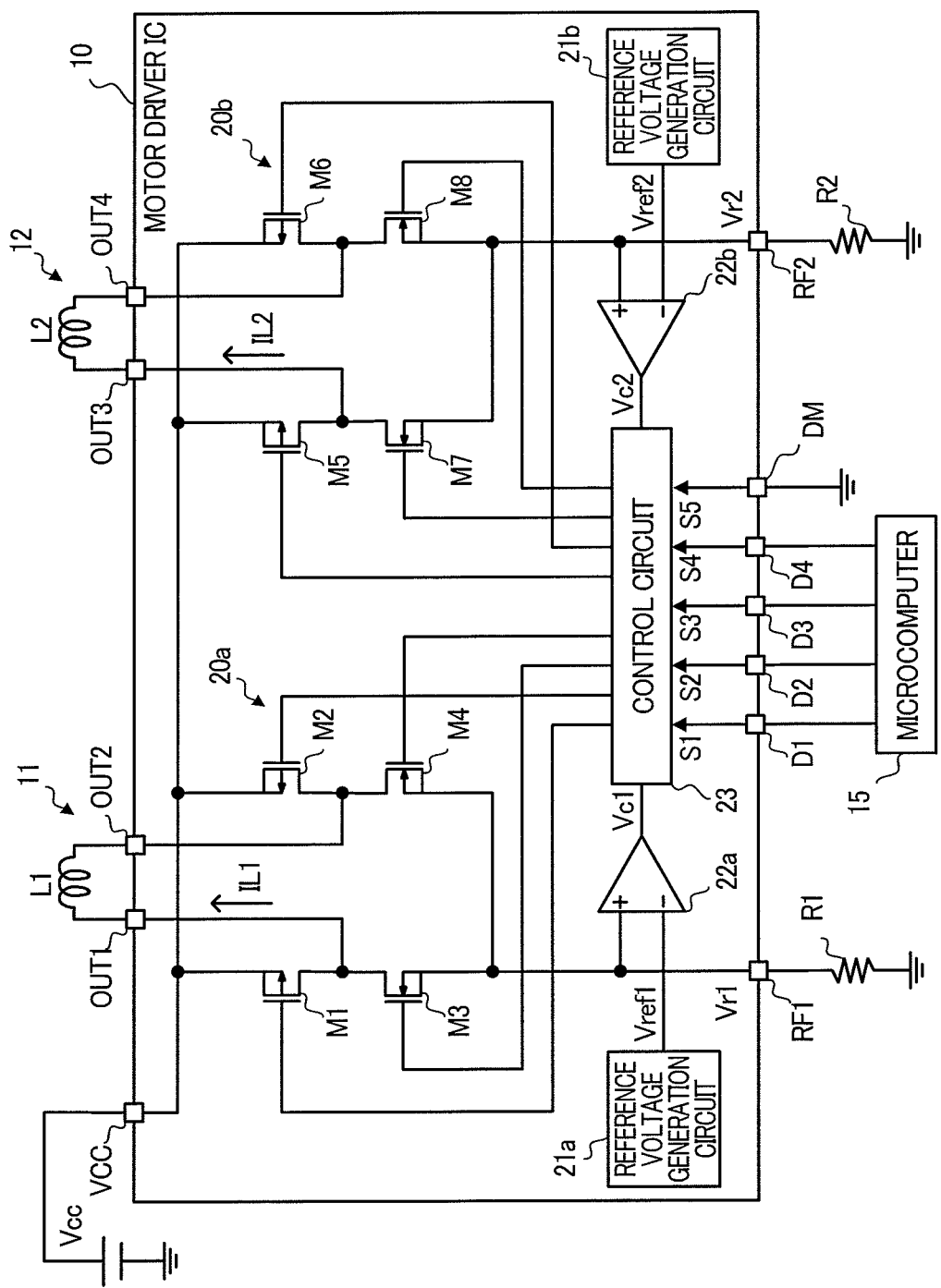
FIG. 1 is a diagram illustrating a first example of application of a motor driver IC 10 according to an embodiment of the present invention.

FIG. 1 is a diagram illustrating a first example of application of a motor driver IC (Integrated Circuit) 10 according to an embodiment of the present invention. In FIG. 1, the motor driver IC 10 is configured to drive two motors 11 and 12.

The motor driver IC 10 (motor drive circuit) is configured to drive the motor connected to the motor drive circuit IC 10 in accordance with an instruction from a microcomputer 15. The motor driver IC 10 includes H-bridge circuits 20a and 20b, reference voltage generation circuits 21a and 21b, comparators 22a and 22b, and a control circuit 23. The motor driver IC 10 is provided with terminals VCC, OUT1 to OUT4, RF1, RF2, D1 to D4, and DM as connection terminals connected to the outside.

The motors 11 and 12 are DC (direct-current) motors used for controlling a printer head mechanism or a paper feed mechanism, for example, and includes motor coils L1 and L2. The microcomputer 15 is a circuit configured to control an operation of the motor driver IC 10 and output signals S1 to S4 to control the motor driver IC 10 through the terminals D1 to D4.

The H-bridge circuit 20a (first H-bridge circuit) includes PMOS transistors M1 and M2 and NMOS transistors M3 and M4.

A connection point between the PMOS transistor M1 (first source transistor) and the NMOS transistor M3 (first sink transistor) is connected to the terminal OUT1, and a connection point between the PMOS transistor M2 (second source transistor) and the NMOS transistor M4 (second sink transistor) is connected to the terminal OUT2. Each of the PMOS transistors M1 and M2 and the NMOS transistors M3 and M4 includes a body diode (not shown).

The H-bridge circuit 20b (second H-bridge circuit) includes PMOS transistors M5 and M6 and NMOS transistors M7 and M8. A connection point between the PMOS transistor M5 (third source transistor) and the NMOS transistor M7 (third sink transistor) is connected to the terminal OUT3, and a connection point between the PMOS transistor M6 (fourth source transistor) and the NMOS transistor M8 (fourth sink transistor) is connected to the terminal OUT4.

Each of the PMOS transistors M5 and M6 and the NMOS transistors M7 and M8 includes a body diode (not shown). In FIG. 1, the motor coil L1 is connected between the terminal OUT1 and the terminal OUT2, and the motor coil L2 is connected between the terminal OUT3 and the terminal OUT4.

The reference voltage generation circuit 21a is configured to output a reference voltage Vref1 of a level according to the instruction from the microcomputer 15 inputted through a terminal (not shown).

The comparator 22a is configured to compare a voltage Vr1 generated at the terminal RF1 with the reference voltage Vref1, to output a signal Vc1 indicating a comparison result. In FIG. 1, a resistor R1 is connected to the terminal RF1. Thus, the voltage Vr1 results in a voltage according to a current IL1 flowing through the motor coil L1. Therefore, if the voltage Vr1 is lower than the reference voltage Vref1, the comparator 22a outputs the low-level ("L" level) signal Vc1 indicating that the current value of the current IL1 is smaller than a set current value I1 corresponding to the reference voltage Vref1. On the other hand, if the voltage Vr1 is higher than the reference voltage Vref1, the comparator 22a outputs the high-level ("H" level) signal Vc1 indicating that the current value of the current IL1 is greater than the set current value I1.

The reference voltage generation circuit 21b is configured to output a reference voltage Vref2 of a level according to the instruction from the microcomputer 15, similarly to the reference voltage circuit 21a.

The comparator 22b is configured to compare a voltage Vr2 generated at the terminal RF2 with the reference voltage Vref2, to output a signal Vc2 indicating a comparison result, similarly to the comparator 22a. A resistor R2 is connected to the terminal RF2. Thus, the voltage Vr2 results in a voltage according to a current IL2 flowing through the motor coil L2, and the comparator 22b determines whether or not the current value of the current IL2 is greater than a set current value I2 corresponding to the reference voltage Vref2.

The control circuit 23 is a logic circuit configured to control the H-bridge circuits 20a and 20b based on the signals S1 to S4 inputted from the microcomputer 15, a signal S5 inputted from the terminal DM, and the signals Vc1 and Vc2.

Figure 2:
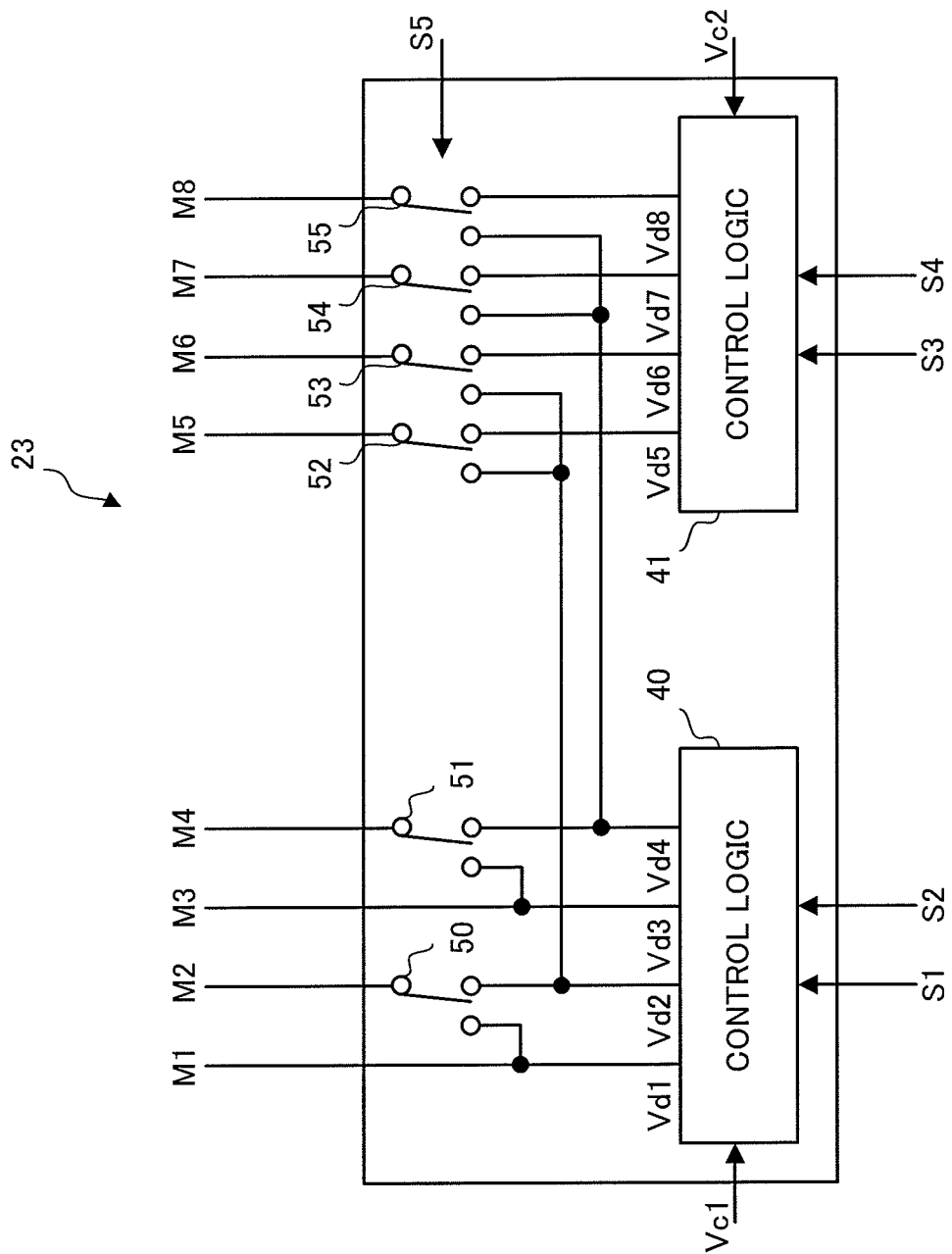
FIG. 2 is a diagram illustrating an example of a configuration of a control circuit 23.

FIG. 2 is a diagram illustrating an embodiment of the control circuit 23. The control circuit 23 includes control logics 40 and 41 and switches 50 to 55. The control logic 40 and the switches 50 to 55 correspond to a first control circuit, and the control logic 41 and the switches 50 to 55 correspond to a second control circuit.

The control logic 40 is configured to output driving signals Vd1 to Vd4 to drive the transistors in the H-bridge circuit 20a in accordance with the signals S1, S2, and Vc1. The signals S1 and S2 are inputted from the microcomputer 15 in order to change the mode of the motor driven by the H-bridge circuit 20a.

First, a description will be given of the driving signals Vd1 to Vd4 outputted by the control logic 40 based on the signals S1 and S2 from the microcomputer 15 if the signal Vc1 is low ("L" level). Hereinafter, if the signals S1 and S2 are low, they are denoted to as (S1, S2)=(L, L).

The control logic 40 outputs such driving signals Vd1 to Vd4 as to turn off all the transistors in the H-bridge circuit 20a if (S1, S2)=(L, L) indicating a standby mode is inputted thereto. The driving signals in this case are (Vd1, Vd2, Vd3, Vd4)=(H, H, L, L).

The control logic 40 outputs such driving signals Vd1 to Vd4 that the PMOS transistor M1 and the NMOS transistor M4 are turned on in a synchronized manner and the PMOS transistor M2 and the NMOS transistor M3 are turned off in a synchronized manner, when (S1, S2)=(H, L) indicating a normal rotation mode is inputted thereto, for example. As a result, the level of the terminal OUT1 goes high, and the level of the terminal OUT2 goes low. The driving signals in this case are (Vd1, Vd2, Vd3, Vd4)=(L, H, L, H).

The control logic 40 outputs such driving signals Vd1 to Vd4 that the PMOS transistor M2 and the NMOS transistor M3 are turned on in a synchronized manner and the PMOS transistor M1 and the NMOS transistor M4 are turned off in a synchronized manner, when (S1, S2)=(L, H) indicating a reverse rotation mode is inputted thereto, for example. As a result, the level of the terminal OUT1 goes low, and the level of the terminal OUT2 goes high. The driving signals in this case are (Vd1, Vd2, Vd3, Vd4)=(H, L, H, L).

The control logic 40 outputs such driving signals Vd1 to Vd4 that the NMOS transistors M3 and M4 are turned on in a synchronized manner and the PMOS transistors M1 and M2 are turned off in a synchronized manner, when (S1, S2)=(H, H) indicating a brake mode is inputted thereto. As a result, the levels of the terminals OUT1 and OUT2 go low. The driving signals in this case are (Vd1, Vd2, Vd3, Vd4)=(H, H, H, H).

On the other hand, if the signal Vc is high ("H" level), the control logic 40 outputs such driving signals Vd1 to Vd4 that all the transistors in the H-bridge circuit 20a are turned off after the levels of the terminals OUT1 and OUT2 go low. That is, the control logic 40 outputs such driving signals Vd1 to Vd4 that the motor driven by the H-bridge circuit 20a enters the brake mode, and thereafter enters a standby mode.

The control logic 41 is configured to output driving signals Vd5 to Vd8 to drive the transistors in the H-bridge circuit 20b in accordance with the signals S3, S4, and Vc2. Since the control logic 41 is similarly to the control logic 40, detailed description thereof will be omitted here.

When the signal S5 is low, the switches 50 to 55 cause the H-bridge circuit 20a to output the driving signals Vd1 to Vd4, and cause the H-bridge circuit 20b to output the driving signals Vd5 to Vd8. Specifically, the switch 50 outputs the driving signal Vd2 to the PMOS transistor M2, and the switch 51 outputs the driving signal Vd4 to the NMOS transistor M4. Further, the switches 52 to 55 output the driving signals Vd5 to Vd8 to the PMOS transistors M5 and M6 and the NMOS transistors M7 and M8, respectively. The driving signals Vd1 and Vd3 are outputted to the PMOS transistor M1 and the NMOS transistor M3, respectively regardless of the logic level of the signal S5.

On the other hand, if the signal S5 is high, the switches 50 to 55 cause the H-bridge circuits 20a and 20b to output the driving signals Vd1 to Vd4. Specifically, the switch 50 outputs the driving signal Vd1 to the PMOS transistor M2, and the switch 51 outputs the driving signal Vd3 to the NMOS transistor M4. The switches 52 and 53 output the driving signal Vd2 to the PMOS transistors M5 and M6, and the switches 54 and 55 output the driving signal Vd4 to the NMOS transistors M7 and M8.

Therefore, if the signal S5 is high, the PMOS transistors M1 and M2 change similarly based on the driving signal Vd1, and the NMOS transistors M3 and M4 change similarly based on the driving signal Vd3. Further, the PMOS transistors M5 and M6 change similarly based on the driving signal Vd2, and the NMOS transistors M7 and M8 change similarly based on the driving signal Vd4.

That is, in an embodiment of the present invention, if the signal S5 is low, the control logics 40 and 41 controls the H-bridge circuits 20a and 20b, respectively, and if the signal S5 is high, the control logic 40 controls both the H-bridge circuits 20a and 20b.

In FIG. 1, since the terminal DM is grounded, the signal S5 is low. Therefore, the control circuit 23 controls the H-bridge circuit 20a based on the signals S1 and S2 from the microcomputer 15, and controls the H-bridge circuit 20b based on the signals S3 and S4. That is, the motor driver IC 10 illustrated in FIG. 1 is capable of controlling the motors 11 and 12 in an independent manner so as to put each of the motors 11 and 12 into a desired mode. In an embodiment according to the present invention, for example, the set current values I1 and I2 are respectively set at current values at a time when the currents IL1 and IL2 flowing through the motor coils L1 and L2 reach overcurrent levels. If the currents IL1 and IL2 reach overcurrent levels, the motors 11 and 12 enter the brake mode, and thereafter the standby mode. Therefore, the motor driver IC 10 can protect the motors 11 and 12 from the overcurrents.

==Second Example of Application of Motor Driver IC 10==

Figure 3:
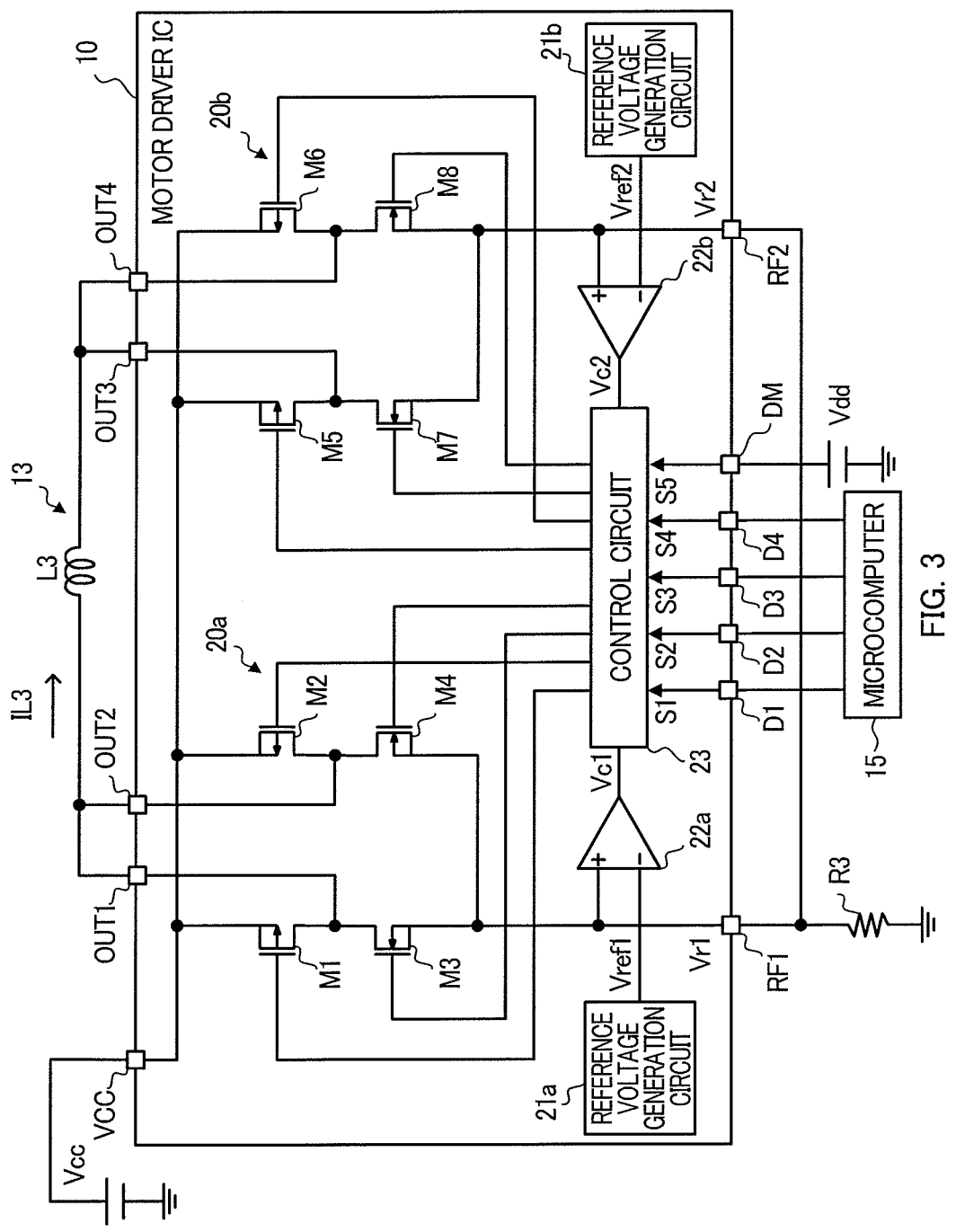
FIG. 3 is a diagram illustrating a second example of application of a motor driver IC 10 according to an embodiment of the present invention.
Figure 4:
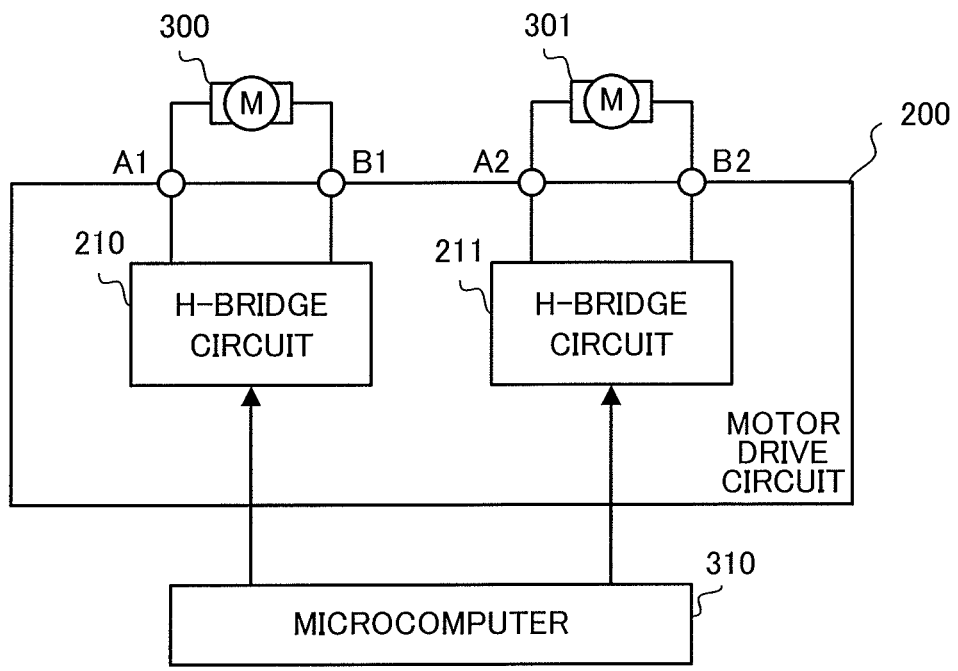
FIG. 4 is a diagram illustrating an example when a common motor drive circuit 200 drives two motors.
Figure 5:
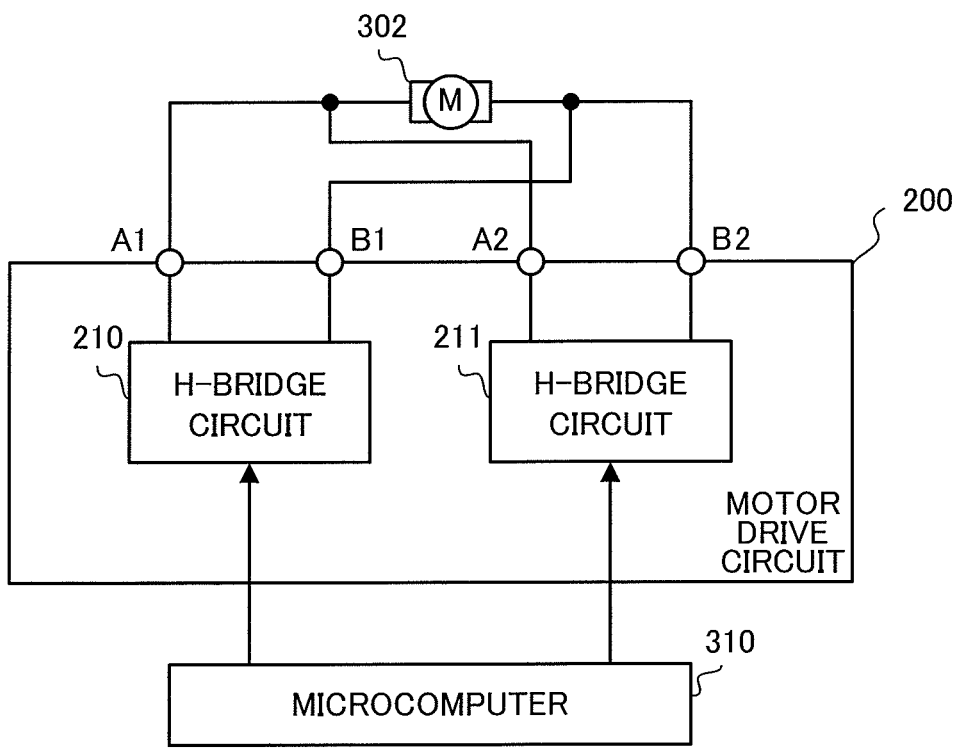
FIG. 5 is a diagram illustrating an example when a common motor drive circuit 200 drives one motor.

FIG. 3 is a diagram illustrating a second example of application of the motor driver IC 10. In FIG. 3, the motor driver IC 10 drives one motor 13. The motor driver IC 10 in FIG. 3 is similar to the motor driver IC 10 in FIG. 1, but is different with respect to a motor coil and a resistor connected outside of the motor driver IC 10 to terminals thereof and further different in a manner in which the motor coil and the resistor are connected to the terminals of the motor driver IC 10.

Specifically, a motor coil L3 of the motor 13, which is a DC motor, is connected between the terminals OUT1, OUT2 and the terminals OUT3, OUT4. A resistor R3 common to the terminal RF1 and the terminal RF2 is connected thereto. Further, the terminal DM is applied with a voltage Vdd so that the signal S5 goes high.

As described above, if the signal S5 is high, such driving signals Vd1 to Vd4 as to change based on the signals S1 and S2 are outputted to the H-bridge circuits 20a and 20b from the control circuit 23.

For example, if (S1, S2)=(L, L) indicating the standby mode is inputted, the control circuit 23 outputs the driving signals (Vd1, Vd2, Vd3, Vd4)=(H, H, L, L). That is, the high-level driving signal Vd1 is outputted to the PMOS transistors M1 and M2, and the high-level driving signal Vd2 is outputted to the PMOS transistors M5 and M6. Further, the low-level driving signal Vd3 is outputted to the NMOS transistors M3 and M4, and the low-level driving signal Vd4 is outputted to the NMOS transistors M7 and M8. As a result, all the transistors included in the H-bridge circuits 20a and 20b are turned off.

If (S1, S2)=(H, L) indicating the normal rotation mode is inputted, the control circuit 23 outputs the driving signals (Vd1, Vd2, Vd3, Vd4)=(L, H, L, H). As a result, the PMOS transistors M1 and M2 and the NMOS transistors M7 and M8 are turned on in a synchronized manner, the terminals OUT1 and OUT2 go high in level, and the terminals OUT3 and OUT4 go low in level.

If (S1, S2)=(L, H) indicating the reverse rotation mode is inputted, the control circuit 23 outputs the driving signals (Vd1, Vd2, Vd3, Vd4)=(H, L, H, L). As a result, the PMOS transistors M5 and M6 and the NMOS transistors M3 and M4 are turned on in a synchronized manner, the terminals OUT1 and OUT2 go low in level, and the terminals OUT3 and OUT4 go high in level.

If (S1, S2)=(H, H) indicating the brake mode is inputted, the control circuit 23 outputs the driving signals (Vd1, Vd2, Vd3, Vd4)=(H, H, H, H). As a result, the NMOS transistors M3 and M4 and the NMOS transistors M7 and M8 are turned on in a synchronized manner, and the terminals OUT1 to OUT4 go low in level.

As such, if the signal S5 is high, the control circuit 23 controls the H-bridge circuits 20a and 20b based on the signals S1 and S2 from the microcomputer 15, and thus the motor driver IC 10 can put the motor 13 into a desired mode.

Here, the set current value I1 is set at a current value at a time when a current IL3 flowing through the motor coil L3 reaches an overcurrent level. Thus, if the current IL3 reaches an overcurrent state, the motor 13 enters the brake mode, and thereafter the standby mode. Therefore, the motor driver IC 10 can protect the motor 13 from the overcurrent.

The motor driver IC 10 according to an embodiment of the present invention has been described hereinabove. The motor driver IC 10 turns on or off the PMOS transistors M1 and M2 and the NMOS transistors M7 and M8 in a synchronized manner and turns on or off the PMOS transistors M5 and M6 and the NMOS transistors M3 and M4 in a synchronized manner, when driving the motor 13. In such a case, the terminals OUT1 and OUT2 change in level similarly, and the terminals OUT3 and OUT4 change in level similarly. Therefore, it is possible to connect the adjacent terminals OUT1 and OUT2 through wiring, and to connect the adjacent terminals OUT3 and OUT4 through wiring. Thus, the motor driver IC 10 can cause the two H-bridge circuits 20a and 20b to drive the common motor coil L3 with wiring being simplified.

Further, if the low-level signal S5 (second instruction signal) is inputted, the motor driver IC 10 drives different motor coils L1 and L2, and if the high-level signal S5 (first instruction signal) is inputted, the motor driver IC 10 can drive the common motor coil L3. Thus, a user can select whether to cause the motor driver IC 10 to drive two motors or one motor. Further, it is not necessary to individually manufacture a motor driver IC exclusively for driving one motor or a motor driver IC exclusively for driving two motors, thereby being able to reduce the number of so-called service parts.

In the control circuit 23, in FIG. 3, if the current (first sink current) flowing from the NMOS transistors M3, M4, M7, and M8, that is, the current value of the current IL3 reaches a current value greater than or equal to the set current value I1, the comparator 22a detects that the current IL3 reaches an overcurrent state. Therefore, in a case where the common motor 13 is driven by the two H-bridge circuits 20a and 20b as well, the overcurrent of the current IL3 can be reliably prevented. Further, for example, in a case where the current is an overcurrent state if an H-bridge circuit 20a is controlled based on the signal Vc1 from the comparator 22a and an H-bridge circuit 20b is controlled based on the signal Vc2 from the comparator 22b, a through current might be generated from the power supply Vcc side to the ground side due to a gap in control timing between the circuits, or the like. In an embodiment of the present invention, since the H-bridge circuits 20a and 20b are controlled based on only the signal Vc1, generation of the through current can be suppressed.

Further, the driving signals Vd1 to Vd4 when the common motor 13 is driven are generated by the control logic 40 based on the signals S1 and S2. Therefore, it is not necessary to separately provide another control logic when the common motor 13 is driven.

Further, the signals S1 and S2 are inputted to the control circuit 23 through the terminals D1 and D2. Thus, a terminal exclusively for driving the motor 13 does not have to be provided.

The above embodiments of the present invention are simply for facilitating the understanding of the present invention and are not in any way to be construed as limiting the present invention. The present invention may variously be changed or altered without departing from its spirit and encompass equivalents thereof.

For example, the motor coils L1 and L2 are assumed to be motor coils of the motors 11 and 12, which are DC motors, but it is not limited thereto. For example, the motor coils L1 and L2 may be motor coils of stepping motors.

What is claimed is:

1. A motor drive circuit comprising:
   a first H-bridge circuit including a first source transistor and a first sink transistor connected in series and a second source transistor and a second sink transistor connected in series;
   a second H-bridge circuit including a third source transistor and a third sink transistor connected in series and a fourth source transistor and a fourth sink transistor connected in series; and
   a first control circuit;
   a second control circuit,
   wherein the first control circuit is configured to turn on or off the first and second source transistors and the third and fourth sink transistors in a synchronized manner, turn on or off the third and fourth source transistors and the first and second sink transistors in a synchronized manner, and further turn on or off the first and second source transistors and the third and fourth sink transistors in a complementary manner to the third and fourth source transistors and the first and second sink transistors, if a first instruction signal to instruct the first and second H-bridge circuits to drive a common motor coil is inputted to the first control circuit, and
   the second control circuit is configured to turn on or off the first source and second sink transistors and the second source and first sink transistors in a complementary manner, and turn on or off the third source and fourth sink transistors and the fourth source and third sink transistors in a complementary manner, if a second instruction signal to instruct the first and second H-bridge circuits to respectively drive different motor coils is inputted to the second control circuit.

2. The motor drive circuit according to claim 1,
   wherein the first control circuit is configured to control the first and second H-bridge circuits so that a first sink current is reduced, if a signal indicating that a current value of the first sink current from the first to fourth sink transistors is greater than or equal to a first set current value is inputted to the first control circuit, and
   the second control circuit is configured to control the first H-bridge circuit so that a second sink current is reduced, if a signal indicating that a current value of the second sink current from the first and second sink transistors is greater than a second set current value is inputted to the second control circuit, and control the second H-bridge circuit so that a third sink current is reduced, if a signal indicating that a current value of the third sink current from the third and fourth sink transistors is greater than a third set current value is inputted to the second control circuit,
   wherein the first set current value is set at a current value at a time when the first sink current reaches an overcurrent level, the second set current value is set at a current value at a time when the second sink current reaches an overcurrent level, and the third set current value is set at a current value at a time when the third sink current reaches an overcurrent level.

3. The motor drive circuit according to claim 2,
   wherein the second control circuit is configured to turn on or off the first source and second sink transistors and the second source and first sink transistors in a complementary manner based on a first control signal to control an operation of the first H-bridge circuit, and turn on or off the third source and fourth sink transistors and the fourth source and third sink transistors in a complementary manner, based on a second control signal to control an operation of the second H-bridge circuit, if the second instruction signal is inputted to the second control circuit, and
   the first control circuit is configured to turn on or off the first and second source transistors and the third and fourth sink transistors in a synchronized manner based on the first control signal, turn on or off the third and fourth source transistors and the first and second sink transistors in a synchronized manner, and further turn on or off the first and second source transistors and the third and fourth sink transistors in a complementary manner to the third and fourth source transistors and the first and second sink transistors, based on the first control signal, if the first instruction signal is inputted to the first control circuit.

4. The motor drive circuit according to claim 3,
   wherein the motor drive circuit is an integrated circuit, and includes a first terminal to which the first control signal is inputted, and a second terminal in which the second control signal is inputted.

5. The motor drive circuit according to claim 1,
   wherein the second control circuit is configured to turn on or off the first source and second sink transistors and the second source and first sink transistors in a complementary manner based on a first control signal to control an operation of the first H-bridge circuit, and turn on or off the third source and fourth sink transistors and the fourth source and third sink transistors in a complementary manner, based on a second control signal to control an operation of the second H-bridge circuit, if the second instruction signal is inputted to the second control circuit, and
   the first control circuit is configured to turn on or off the first and second source transistors and the third and fourth sink transistors in a synchronized manner based on the first control signal, turn on or off the third and fourth source transistors and the first and second sink transistors in a synchronized manner, and further turn on or off the first and second source transistors and the third and fourth sink transistors in a complementary manner to the third and fourth source transistors and the first and second sink transistors, based on the first control signal, if the first instruction signal is inputted to the first control circuit.

6. The motor drive circuit according to claim 5,
   wherein the motor drive circuit is an integrated circuit, and includes a first terminal to which the first control signal is inputted, and a second terminal in which the second control signal is inputted.

7. The motor drive circuit of claim 2, wherein the first H-bridge circuit, the second H-bridge circuit, and the control circuit are combined on an integrated circuit.

8. A motor drive circuit comprising:
   a first control circuit having an input for receiving first data and an output for providing a first plurality of control signals to selectively drive transistors in a first H-bridge circuit;
   a second control circuit having an input for receiving second data and an output for providing a second plurality of control signals to selectively drive transistors in a second H-bridge circuit; and
   a switching circuit responsive to a drive mode signal wherein the switching circuit couples the first plurality of control signals to a corresponding first output thereof and the second plurality of control signals to a corresponding second output thereof in response to a first state of the drive mode signal, and couples the first plurality of control signals to the first and second outputs thereof in response to a second state of the drive mode signal, wherein the switching circuit provides respective source drive signals to both transistors of a corresponding source transistor pair within the first and second H-bridge circuits, and respective sink drive signals to both transistors of a corresponding sink transistor pair within the first and second H-bridge circuits in response to the second state of the control signal, wherein the switching circuit configures the first and second control circuits to jointly drive one motor in responsive to said second state and to drive separate motors responsive to said first state.

9. The motor drive circuit of claim 8 wherein the first plurality of control signals comprises first, second, third, and fourth control signals for selectively driving gates of respective first, second, third, and fourth transistors of the first H-bridge circuit in response to the first state of the drive mode signal.

10. The motor drive circuit of claim 9 wherein the switching circuit couples the first, second, third, and fourth control signals to respective first, second, third, and fourth terminals of the first output thereof in response to the first state of the drive mode signal, and couples the first control signal to both the first and the second terminals of the first output thereof and the third control signal to both the third and fourth terminals of the first output thereof in response to the second state of the drive mode signal.

11. The motor drive circuit of claim 9 wherein the second plurality of control signals comprises fifth, sixth, seventh, and eighth control signals for driving gates of respective fifth, sixth, seventh, and eighth transistors of the second H-bridge circuit in response to the first state of the drive mode signal.

12. The motor drive circuit of claim 11 wherein the switching circuit couples the fifth, sixth, seventh, and eighth control signals to respective fifth, sixth, seventh, and eighth terminals of the second output thereof in response to the first state of the drive mode signal, and couples the second control signal to both the fifth and sixth terminals of the second output thereof and the fourth control signal to both the seventh and eighth terminals of the second output thereof in response to the second state of the drive mode signal.

13. The motor drive circuit of claim 8 wherein the first control circuit, the second control circuit, and the switching circuit are combined on an integrated circuit.

14. The motor drive circuit of claim 13 wherein the first H-bridge circuit and the second H-bridge circuit are combined on the integrated circuit.

15. A method for controlling a first H-bridge circuit and a second H-bridge circuit comprising:
in a first mode, selectively activating a first plurality of control signals to drive transistors in the first H-bridge circuit according to first data to cause rotation of a first motor connected to an output of the first H-bridge circuit, and selectively activating a second plurality of control signals to drive transistors in the second H-bridge circuit according to second data to cause rotation of a second motor connected to an output of the second H-bridge circuit;
in a second mode, selectively activating the first plurality of control signals to drive both the transistors in the first H-bridge circuit and the transistors in the second H-bridge circuit according to the first data to cause rotation of a single motor connected to the outputs of both the first H-bridge circuit and the second H-bridge circuit, wherein the selectively activating comprises selectively activating respective source drive signals to both transistors of a corresponding source transistor pair within the first and second H-bridge circuits, and selectively activating respective sink drive signals to both transistors of a corresponding sink transistor pair within the first and second H-bridge circuits; and
wherein the first and second H-bridge circuits jointly drive one motor in said second mode and drive separate motors in said first mode.

16. The method of claim 15, further comprising:
selecting the first mode in response to a first state of a drive mode signal and the second mode in response to a second state of the drive mode signal.

17. The method of claim 16, wherein selectively activating the first plurality of control signals in the first mode comprises:
selectively activating first, second, third and fourth control signals to drive gates of respective first, second, third, and fourth transistors of the first H-bridge circuit.

18. The method of claim 17, further comprising:
coupling the first control signal to the gates of both the first transistor and the second transistor of the first H-bridge circuit in response to the second state of the drive mode signal; and
coupling the third control signal to the gates of both the third transistor and the fourth transistor of the first H-bridge circuit in response to the second state of the drive mode signal.

19. The method of claim 18, further comprising:
selectively activating fifth, sixth, seventh, and eighth control signals to drive gates of respective fifth, sixth, seventh, and eighth transistors of the second H-bridge circuit;
coupling the second control signal to the gates of both the fifth transistor and the sixth transistor of the second H-bridge circuit in response to the second state of the drive mode signal; and
coupling the fourth control signal to the gates of both the seventh transistor and the eighth transistor of the second H-bridge circuit in response to the second state of the drive mode signal.

* * * * *